United States Patent [19]

Kittell

[11] Patent Number: 5,249,197
[45] Date of Patent: Sep. 28, 1993

[54] MOUNTING FOR AN OPTICAL COMPONENT
[75] Inventor: David Kittell, Stamford, Conn.
[73] Assignee: Amoco Corporation, Chicago, Ill.
[21] Appl. No.: 794,728
[22] Filed: Nov. 15, 1991
[51] Int. Cl.$^5$ .............................................. H01S 3/086
[52] U.S. Cl. ...................................... 372/107; 359/872
[58] Field of Search ........................... 372/107; 359/872
[56] References Cited

U.S. PATENT DOCUMENTS

| | | | |
|---|---|---|---|
| 4,278,324 | 7/1981 | Zipfel ................................... | 372/107 |
| 4,730,335 | 3/1988 | Clark et al. ........................... | 372/98 |
| 4,856,020 | 8/1989 | Ortiz .................................... | 372/107 |
| 4,890,296 | 12/1989 | Crosby ................................. | 372/107 |

Primary Examiner—James W. Davie
Attorney, Agent, or Firm—Stephen G. Mican

[57] ABSTRACT

An optical mounting is described and which has two opposite faces, a reference axis which is generally perpendicular to the faces, at least one arcuate slot which joins the faces and which defines an interior part and an exterior part and means for moving the interior part relative to the exterior part. The slot has sufficient length and width so as to allow limited movement between the two parts. The interior part has an aperture located therein for receiving an optical component.

21 Claims, 2 Drawing Sheets

MOUNTING FOR AN OPTICAL COMPONENT

TECHNICAL FIELD

This invention relates to the general subject of optics and, in particular, to devices used to adjustably mount an optical component of a laser.

BACKGROUND OF THE INVENTION

Lasers utilize, for their operation, an active material located within a laser cavity which is made optically resonant by placing reflectors at either end thereof to form the optical resonator of the laser. One of the reflectors functions as an output coupler or means for transmitting laser light out of the laser cavity. Resonator reflector design is often specified to be within 1/10 or 1/20 of a wavelength of light and frequency to be within 1/100 of a wavelength of light. In other words, deviations in excess of 1/1,000,000 of an inch may not be acceptable.

It has long been recognized that the alignment of all of the laser components is of critical importance in order to maintain maximum output. Especially important is the alignment of the output coupler. U.S. Pat. No. 4,730,335 which is assigned to the assignee of the present invention, describes one means by which laser components are aligned. U.S. Pat. No. 4,890,296, which is also assigned to the assignee of the present invention, describes one means for mounting the output coupler of a laser.

Laser systems also may make use of one or more optical mirrors for bending, splitting, focusing or redirecting beams of light. These mirrors are usually attached to some form of mounting device which is anchored to a supporting surface. It is essential that the mirrors, or other optical components in the path of the laser beam, are in precise and accurate optical alignment with respect to the impinging beam of light. Quite often, after the mounting device is affixed to the supporting surface, some adjustment is necessary.

In the past, adjustments have been achieved by inserting one or more shims between the mount and the supporting surface or base. Some of the disadvantages of this technique are that: it very often involves removing the fasteners which are used to affix the mount to the supporting surface; it is time consuming; that it is not always very accurate; and it is sometimes very difficult to carry out successfully. Small adjustments may be very difficult to make.

Another approach has been to use ball and socket joint mounting devices or double gimbel type mounting devices to hold a mirror on the supporting surface. Although these types of mounting devices enable controlled adjustments to be made, they are relatively expensive and hence not very practical for many applications.

Clearly, there is a need for a simple and relatively inexpensive mounting for an optical component which has an easy to use adjustment capability.

SUMMARY OF THE INVENTION

A general object of the invention is to provide a new and improved adjustable mounting for an optical component.

Another object of the invention is to provide an apparatus which uses a relatively thin arcuate flexure to adjustably position an optical component relative to a fixed base.

Still another object of the invention is to provide a means for mounting an output coupler of a laser and for adjusting the relative position of the output coupler.

One specific object of the invention is to provide an optical mounting which has an arcuate flexure which is formed in a metal block by using Electrical Discharge Machining.

Yet another object of the invention is to provide a mounting for the output coupler of a Q-switched solid-state microlaser such that pulse to pulse stability is improved.

It is still another object of this invention to provide a compact and stable optical mirror mount which contains a minimum of parts and which is easy and economical to manufacture.

It is another object of this invention to provide an optical mirror mount which can be easily, quickly and accurately adjusted.

It is still another object of this invention to provide an optical mirror mount which can be adjusted after it has been attached to a supporting surface.

In accordance with the present invention, an optical mounting is provided comprising: a monolithic member having two opposite faces and a reference axis which is generally perpendicular to the faces and having at least one slot which joins the faces and which has an arcuate shape relative to the reference axis so as to form an interior part and an exterior part, the slot having sufficient length and width so as to allow limited movement between the interior part relative to the exterior part, the interior part having a receiving aperture located therein for receiving an optical component; and moving means, carried by the exterior part, for moving the interior part relative to the exterior part.

In addition to providing a convenient and easy to use adjustment for optical components, the invention has the added advantage of improving pulse to pulse stability in a Q-switched solid-state laser. The invention also provides stiffness in the longitudinal direction of a laser cavity, thereby making it easier to control unwanted higher order longitudinal modes. The integral design also assures that differential thermal expansion is minimized. Finally, the radial arrangement of the adjusting screws allows one to reduce the overall length of the laser cavity relative to a design where axial adjustment screws are used.

Numerous other advantages and features of the present invention will become readily apparent from the following detailed description of the invention, the embodiments described therein, from the claims, and from the accompanying drawings.

DETAILED DESCRIPTION

Figure 1:
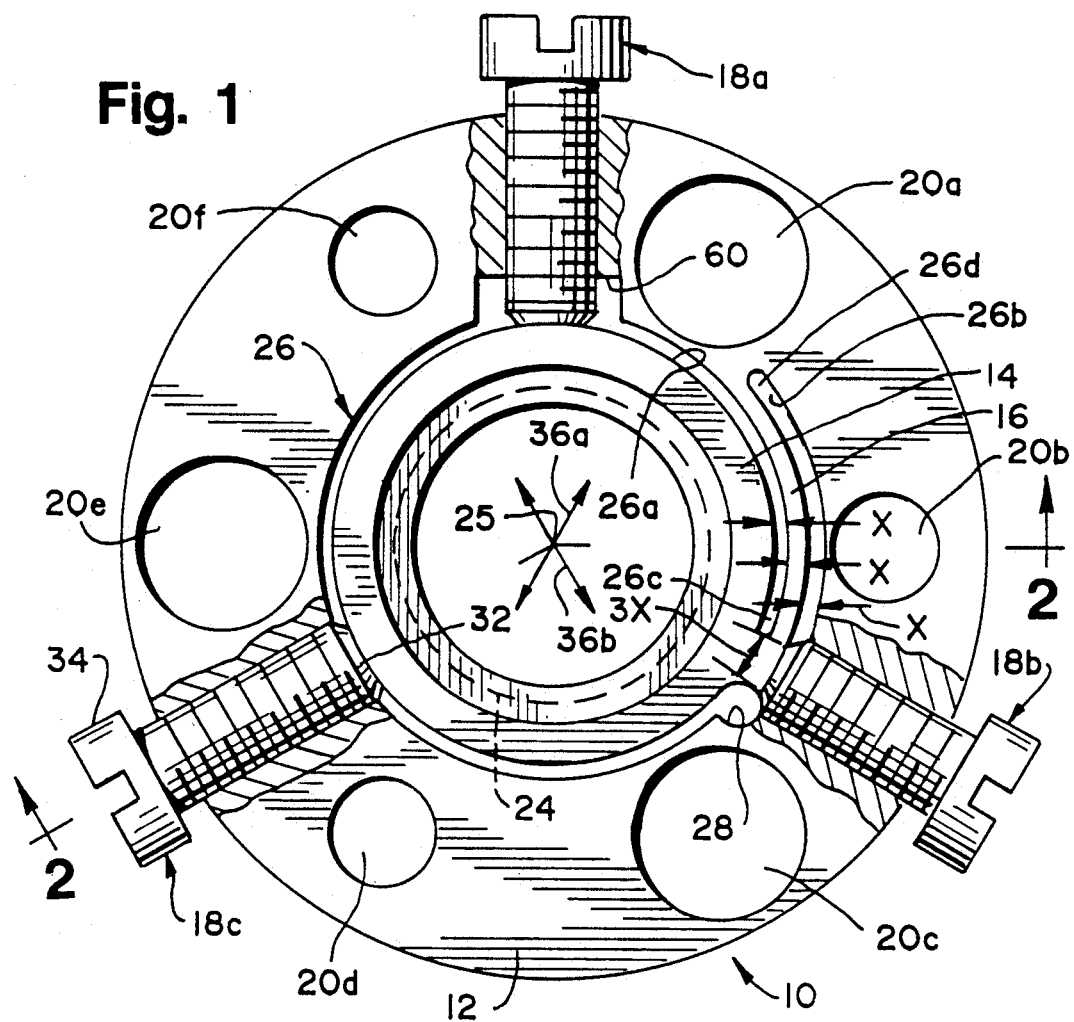
FIG. 1 is a partial, cross-sectional plan view of the optical mounting that is the subject of the present invention.

While this invention is susceptible of embodiment in many different forms, there is shown in the drawings, and will herein be described in detail, one specific embodiment of the invention. It should be understood, however, that the present disclosure is to be considered an exemplification of the principles of the invention and is not intended to limit the invention to the specific embodiment illustrated.

Turning to the drawings, there is illustrated a top or plan view and a cross-sectional side view of the optical mounting 10 that is the subject of the present invention. More specifically, the optical mounting 10 is formed from a single metal block or monolith and it comprises an outer member or base 12, an inner member or part 14, an arcuate blade-like flexure 16, and a plurality of threaded members 18a, 18b and 18c which are used to selectively move the inner member relative to the outer member.

The outer member or base 12 is provided with a plurality of clearance holes 20a, 20c and 20e, and a plurality of mounting holes 20b, 20d and 20f for fixedly holding it in place. The inner member or part 14 has a counterbore 22 for supporting an optical component 24 (shown in phantom), such as an output coupler of a solid-state, diode-pumped laser therein.

Figure 2:
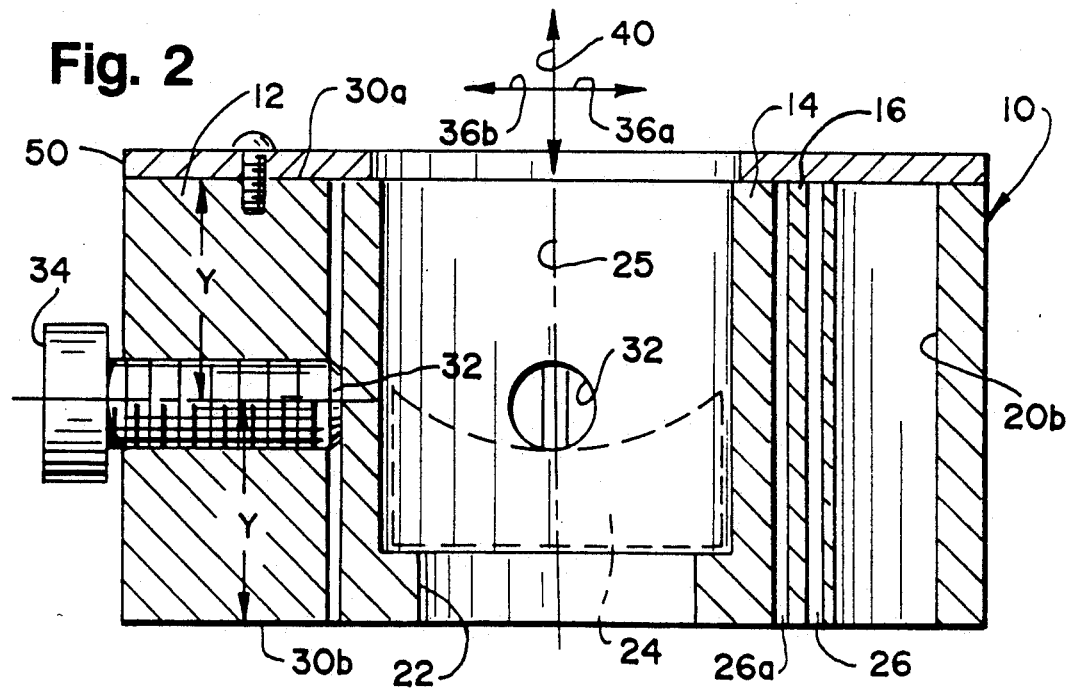
FIG. 2 is a cross-sectional side view of the optical mounting shown in FIG. 1 as viewed along line 2—2.

The inner member 14 is joined to the outer member 12 by means of a thin arcuate flexure 16. The flexure 16 is formed by cutting a slot 26 in a single block of metal. In particular, the slot 26 has two branches or parts 26a and 26b. One slot branch 26a is located closer to the center than the other slot branch 26b. The two groove branches are joined by a drilled passage or pilot hole 28. Preferably, the slot 26 is formed from a monolithic block of metal by Electrical Discharge Machining (EDM). Other methods (e.g., laser beams, diamond wire cutting machines, etc.) may be used. In the mounting 10 illustrated, the two branches 26a and 26b of the slot 26 have overlapping ends 26c and 26d which are at each end of the flexure 16. The slot 26 is cut between the two faces 30a and 30b (See FIG. 2) of the mounting 10. Each branch 26a and 26b of the slot 26 has sufficient length and width to allow limited movement of inner member 14 relative to the outer member or base 12. As a good rule of thumb, the groove 26 and that portion of the flexure 16 between the overlapping slot ends should have the same width "x". In addition, the arcuate distance between the pilot hole 28 and the adjacent slot end 26c should be about three times the width "3x" of the slot 26.

The two members 12 and 14 of the mounting 10 are moved relative to each other by means of threaded members or screws 18a, 18b and 18c (e.g., socket head cap screws, sloted set screws, bolts, etc.) The screws 18a, 18b and 18c are carried by the outer member or part 12. Each screw has an inner end 32 and an opposite or outer end 34. The inner end 32 of each screw is positioned against the inner member 14. The outer end 34 is provided with a means (e.g., a slot, a socket, a hex head, etc.) for moving the screw towards and away from the center of the mounting 10. Preferably, a plurality of adjusting screws 18a, 18b and 18c are provided along the length of the groove. Thus, relative to the outer-most end 26d of the groove 26, each adjusting screw 18a, 18b and 18c is located at farther distances along the length of the flexure 16. This has the effect of providing adjustment screws of varying mechanical advantage (i.e., an increasing lever arm relative to the outer-most end 26d of the groove 26). The net effect of the adjustment screws 18a, 18b and 18c and the flexure 16 is to translate (arrows 36a and 36b) the vertical axis of 25 of the optical component 24, in a plane which is generally perpendicular to the longitudinal axis 40 of the mounting 10. It should be noted that, in some situations, it may be better to use two adjusting screws which are located ninety degrees apart. (See FIG. 1B). In such a case, by backing off one screw, the other screw causes the entire movement of inner member 14. In the design illustrated in FIG. 1, at least two screws are interactive in causing the movement of inner member 14.

In one specific embodiment, the invention was installed in an Amoco Laser Company (Model OEM-1064-500Q) Q-Switched Microlaser. The mounting 10 was made from INVAR, had a thickness of about 0.4 inches, a major diameter of about 0.75 inches and a mirror receiving aperture of about 0.3 inches in diameter. The slot 26 had a kerf or width of 0.020 inches.

During testing of one prototype system, it was discovered that the set screws 18a, 18b and 18c are preferably arranged to apply their force at the mid point "Y" between the top and bottom of the inner member 14. If the set screw 18c is located closer to one end of the inner member 14, this could cause cocking of the inner member relative to the outer member. One way to keep the two members aligned is to install a washer like keeper (See FIG. 2) plate or member 50 which is anchored to the outer member 12 and which extends over the periphery of the inner member 14.

Figure 1A:
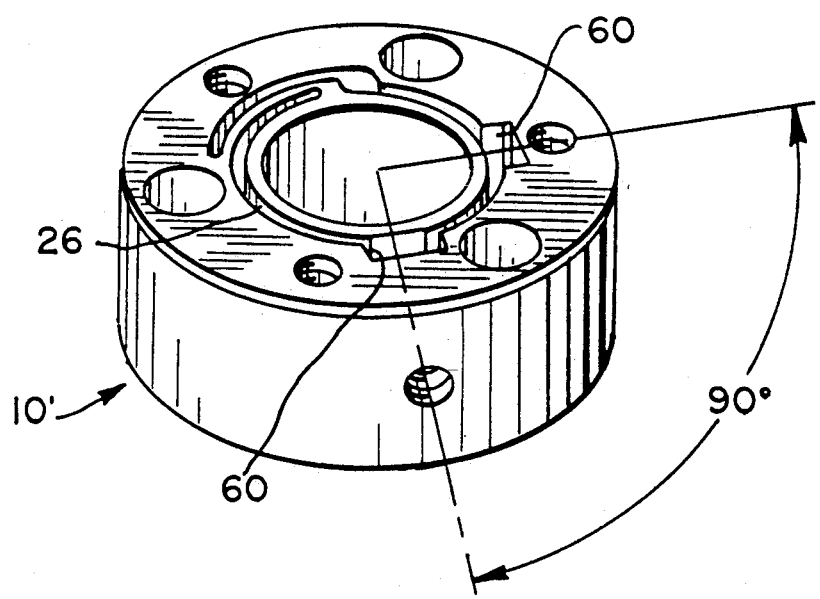
FIGS. 1A and 1B illustrate alternative mounting designs.

It was also discovered that, because of the relative difficulty of drilling and threading bores for the adjusting screws 18a, 18b and 18c in the outer member 12 without damaging the exterior of the inner member 14, it may be necessary to form wide vertical channels 60 (See FIGS. 1A and 1B) at the interior of the outer member.

Figure 1B:
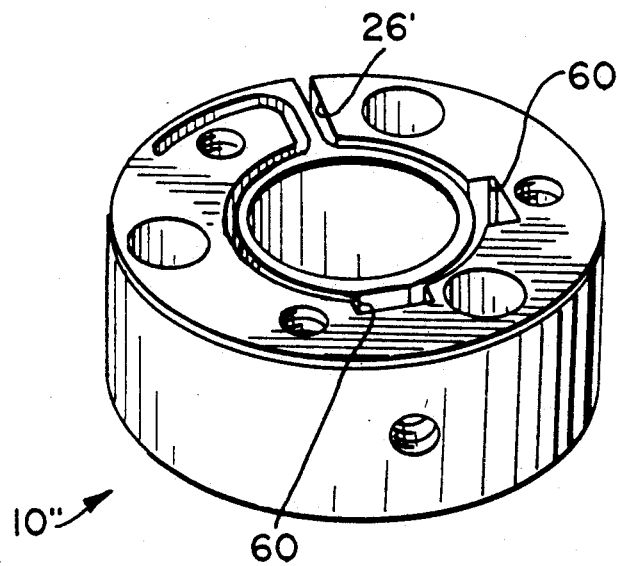

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Various changes may be made, materials substituted and features of the invention may be utilized. For example, although the present invention was described in the context of its use in mounting a laser output coupler or a mirror, it is equally applicable to other optical components, such as an aperture disk, a Brewster plate, a quarter-wave plate, an etalon, etc. As a final example, the groove 26 can be cut in a variety of patterns. In FIG. 1B, the groove has 26' one end which is open to the exterior of the outer member; and the opposite end of the groove is located closer to the periphery of the outer number 12, compared to the design illustrated in FIGS. 1 and 1B. Thus, it will be appreciated that various modifications, alternatives, variations, etc., may be made without departing from the spirit and scope of the invention as defined in the appended claims. It is, of course, intended to cover by the appended claims all such modifications involved within the scope of the claims.

I claim:

1. An optical mounting, comprising:
   a monolithic member having two opposite faces, having a reference axis which is generally perpendicular to said faces and having at least one slot which joins said faces and which has an arcuate shape relative to said reference axis and which has two opposite ends, that portion of said monolithic member between said axis and said slot forming an interior part and the remaining portion of said monolithic member forming an exterior part, said slot having sufficient length and width so as to allow limited movement between said interior part relative to said exterior part, said interior part having a receiving aperture located therein for receiving an optical component; and moving means, carried by one of said interior part and said exterior part, for changing the position of said interior part relative to said exterior part.

2. The optical mounting of claim 1, wherein said moving means comprises at least one threaded shaft which is threadably carried by said exterior part, which is radially positioned relative to said reference axis, which has one end in contact with said interior part, and which has an opposite end which carries means for rotating said shaft from a position exterior to said mounting.

3. The optical mounting of claim 1, wherein said monolithic member has two circular slots which join said faces and has a joining aperture which joins said faces, each of said two slots having one end open to said joining aperture and having an opposite end.

4. The optical mounting of claim 3, wherein one of said two slots is located at a greater distance from said reference axis than the other of said two slots; and wherein said other slot is longer than said one slot.

5. The optical mounting of claim 4, wherein said one slot is located parallel to said other slot; and wherein said opposite ends of said two slots overlap each other so as to define an arcuate flexure which joins said interior part and said exterior part.

6. The optical mounting of claim 3, wherein said joining aperture is a circular bore; and wherein said two slots are formed in said monolithic member using Electrical Discharge Machining.

7. The optical mounting of claim 3, wherein said moving means comprises a plurality of threaded shafts which are threadably carried by said exterior part, which are radially positioned relative to said reference axis, which have one end in contact with said interior part, and which have an opposite end which carries means for rotating that each shaft from a position exterior to said exterior part.

8. The optical mounting of claim 7, wherein said plurality of threaded shafts are distributed between said opposite ends of said two slots.

9. The optical mounting of claim 1, wherein said two opposite ends overlap each other so as to define a relatively thin arcuate flexure which joins said interior part to said exterior part.

10. The optical mounting of claim 1, wherein said receiving aperture comprises a counter-bore which joins said two opposite faces; and wherein said optical component is adapted to be seated within said counter-bore.

11. Apparatus, comprising:
a) a base;
b) carrying means for carrying a high reflectivity mirror having a non-planar light reflecting surface and an optical reference axis;
c) a flexure for movably connecting said carrying means to said base and for restricting movement of said carrying means in directions parallel to said reference axis; and
d) moving means, carried by one of said base and said carrying means and in contact with the other of said base and said carrying means, for moving said carrying means relative to said base and for moving said axis of said mirror through at least one curved path which is in a plane which is generally perpendicular to said reference axis.

12. The apparatus of claim 11, wherein said non-planar surface of said mirror is concave.

13. The apparatus of claim 11, wherein said carrying means comprises: a generally cylindrical member having an aperture for receiving said mirror therein.

14. The apparatus of claim 11, wherein said moving means comprises a threaded shaft having an axis of rotation which is generally at right angles to said reference axis.

15. The apparatus of claim 13, wherein said base has a circular opening therein whose axis is generally parallel to said reference axis; and wherein said cylindrical member is located within said opening in said base so as to define an arcuate gap which is bridged by said flexure.

16. The apparatus of claim 11, wherein said flexure comprises an arcuate member which is centered about an axis which is generally parallel to said reference axis of said mirror and which has one end connected to said base and an opposite end connected to said carrying means.

17. A mounting for a mirror, comprising:
a) a base which has a generally circular opening therein;
b) a flexure;
c) carrying means, having a generally circular plan form and located within said opening in said base so as to define a generally arcuate gap which is bridged by said flexure, for carrying a mirror therein, said mirror, said circular opening, said carrying means and said flexure having reference axes which are generally parallel to each other; and
d) at least one threaded shaft, carried by one of said base and said carrying means for moving said carrying means relative to said base and for moving said reference axis of said mirror relative to said axis of said base and through a curved path.

18. The mounting of claim 17, wherein said one threaded shaft is carried by said base.

19. The mounting of claim 18, further including a second threaded shaft which is carried by said base and which is in contact with said carrying means, for moving said reference axis of said mirror relative to said reference axis of said base, said one threaded shaft and said second threaded shaft being radially located relative to said reference axis of said base.

20. A mounting for a laser output coupler, comprising:
a monolithic member having two opposite generally flat faces, having a reference axis which is generally perpendicular to said faces, and having therein a relatively long slot which joins said faces, which has two opposite ends, which has an axis which is generally parallel to said reference axis and which divides said monolithic member into an interior part and an exterior part, said slot having sufficient length so as to allow limited movement of said interior part relative to said exterior part;
receiving means, carried by said interior part, for receiving an optical component which has an optical axis which is generally parallel to said reference axis; and
moving means for moving said interior part relative to said exterior part, said moving means having a plurality of screws which are carried by said exterior part, which are radially positioned relative to said reference axis, which have one end located at least partially within said slot and in contact with said interior part, and which have an opposite end which carries means for moving each screw toward and away from said reference axis.

21. The mounting of claim 20, further including keeper means, carried by said exterior part, for preventing said interior part from cocking relative to said exterior part.

* * * * *